United States Patent [19]

Heavilon et al.

[11] Patent Number: 5,513,755

[45] Date of Patent: May 7, 1996

[54] METHOD AND APPARATUS FOR REDUCING CARBON CONTENT IN FLY ASH

[75] Inventors: Jerry L. Heavilon, Mariett; Clinton W. Pike, Newman; David R. Savage, Alpharetta; Robert W. Styron, Marietta, all of Ga.

[73] Assignee: JTM Industries, Inc., Kennesaw, Ga.

[21] Appl. No.: 222,102

[22] Filed: Apr. 4, 1994

Related U.S. Application Data

[63] Continuation-in-part of Ser. No. 12,999, Feb. 3, 1993, Pat. No. 5,299,692.

[51] Int. Cl.⁶ .................................................. B03B 9/00
[52] U.S. Cl. ........................... 209/2; 209/11; 209/127.2
[58] Field of Search ......................... 209/2, 8, 11, 127.1, 209/127.2, 127.3, 129, 131

[56] References Cited

U.S. PATENT DOCUMENTS

| | | | |
|---|---|---|---|
| 714,256 | 11/1902 | Sutton et al. | 209/127.1 X |
| 794,647 | 7/1905 | Sutton et al. | 209/127.3 X |
| 1,355,477 | 10/1920 | Howell | 209/127.3 X |
| 1,549,875 | 8/1925 | Horne | 209/127.3 X |
| 1,968,860 | 8/1934 | Strang | 209/127.3 X |
| 2,300,324 | 10/1942 | Thompson | 209/127.1 |
| 2,328,577 | 9/1943 | Oglesby | 209/127.1 X |
| 2,699,869 | 1/1955 | Gear | 209/127.3 |
| 2,848,108 | 8/1958 | Bradstad et al. | 209/127 |
| 2,848,727 | 8/1958 | Johnson | 209/127.1 X |
| 2,889,042 | 6/1959 | Le Baron | 209/127.1 |
| 3,009,573 | 11/1961 | Whipple | 209/130 |
| 3,096,277 | 7/1963 | Nestas | 209/20 |
| 3,217,880 | 11/1965 | Benton | 209/130 |
| 3,253,201 | 5/1966 | Slatkin | 209/127.1 X |
| 3,401,795 | 9/1968 | Tauveron | 209/12 |
| 3,489,279 | 1/1970 | St. John | 209/130 |
| 4,115,256 | 9/1978 | de Zeeuw | 209/3 |
| 4,357,234 | 11/1982 | Inculet et al. | 209/127 |
| 4,374,727 | 2/1983 | Takahashi et al. | 209/127.3 |
| 4,482,351 | 11/1984 | Kitazawa et al. | 209/127.2 |
| 4,517,078 | 5/1985 | Inculet et al. | 209/127 |
| 4,556,481 | 12/1985 | Hepher | 209/127.1 |
| 4,839,032 | 6/1989 | Whitlock | 209/3 |
| 4,874,507 | 10/1989 | Whitlock | 209/11 |

FOREIGN PATENT DOCUMENTS 940389 2/1947 France .

*Primary Examiner*—D. Glenn Dayoan
*Attorney, Agent, or Firm*—Biebel & French

[57] ABSTRACT

A method of treating fly ash which has a moisture content and which also has a high carbon particle content includes the steps of heating the fly ash to a temperature sufficient to break the bond between the fly ash and the carbon particles caused by the moisture content, applying the heated fly ash in a relatively thin layer to the surface of a belt-type conveyor and subjecting the layer of heated fly ash to the effects of an electrostatic charging zone while repeatedly mechanically rearranging the orientation of the fly ash particles in the zone for causing the carbon particles to take a charge and become attracted to an electrode so that the same may be separated from the layer. Apparatus for separating carbon particles from fly ash includes a generally horizontal conveyor, and a hopper which applies fly ash to be treated in a layer on the surface of a conductive belt. The belt carries the fly ash layer through an elongated electrostatic charging zone, and beaters beneath the belt impart a vibration to the belt for causing the fly ash layer to be in a state of agitation. The belt forms a lower electrode, while an upper electrode is spaced above the belt and the entire separation zone is environmentally enclosed to exclude ambient air and moisture from the separating zone. Collection bins are positioned along the lateral sides of the belt for capturing carbon particles discharged from the zone, while the accepts are delivered off of the end of the belt into a suitable bin.

13 Claims, 5 Drawing Sheets

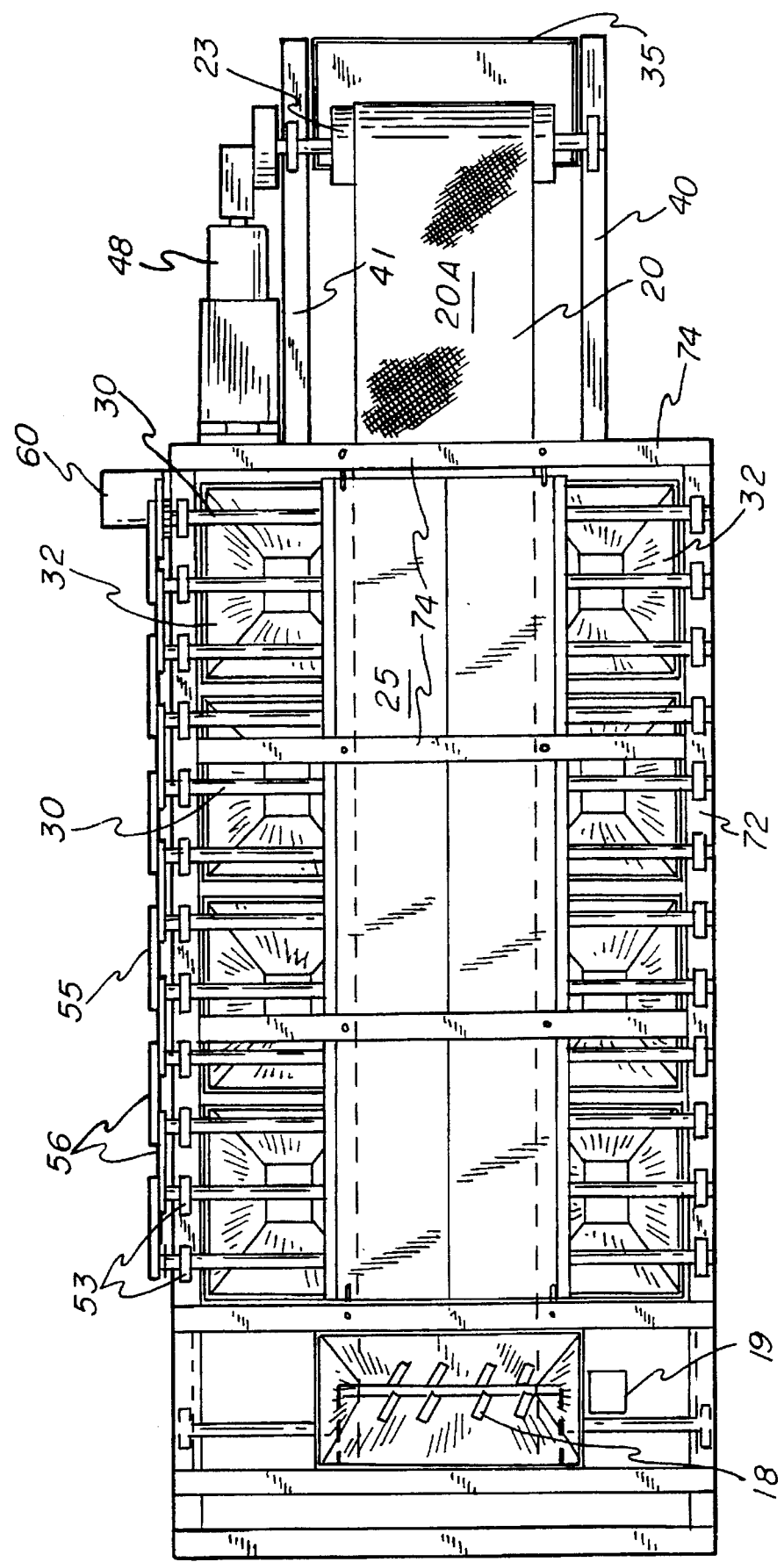

METHOD AND APPARATUS FOR REDUCING CARBON CONTENT IN FLY ASH

RELATED APPLICATIONS

This application is a continuation-in-part of application Ser. No. 08/012,999 filed Feb. 3, 1993, now U.S. Pat. No. 5,299,692.

BACKGROUND OF THE INVENTION

Fly ash is the by-product of burning pulverized coal. The chemical content and particle size of fly ashes vary widely in accordance with the source of the coal, the fineness to which it is ground, and the furnace within which it is burned.

The chemical composition of fly ash may vary generally, as follows:

| Component | Class F Percent by Weight | Class C Percent by Weight |
| --- | --- | --- |
| $SiO_2$ | 35–55 | 20–40 |
| $Al_2O_3$ | 15–35 | 5–15 |
| FeO } $Fe_2O_3$ } | 3–25 | 1–10 |
| CaO | 0.5–8 | 0–35 |
| MgO | 0.5–3 | 0–5 |
| $TiO_2$ | 1–3 | 1–3 |
| $Na_2O$ | 0–1.5 | 0–1.5 |
| $K_2O$ | 0–3 | 0–3 |
| $SO_3$ | 1–3 | 0–6 |
| C | 0.5–20 | 0.5–20 |
| $H_2O$ | 0.5–0.7 | 0.5–3 |

Fly ash can be used for a variety of purposes. Principally, it is used as a replacement for cement in Portland Cement concrete. Additionally, for example, it has been used as filler or extender for plastics and asphalt, as a source of carbon for waste water purification, and as a magnetite source for coal cleaning.

Many class F fly ashes collected throughout the United States have carbon content (measured as Loss on Ignition—LOI) of about 0.5% to 4.0%. These ashes may be sold as an acceptable mineral admixture for use in Portland cement concrete under the standards set forth in ASTM C-618-92a which limits maximum LOI for classes F and C fly ash at 6.0%. As such, these ashes are a commercially attractive commodity, with the sale of same by electrical utilities and industrial concerns providing lucrative revenue.

Unfortunately, not all fly ashes possess such low carbon content as to pass the standards provided in ASTM C-618. These non-conforming fly ashes have LOI content of >6%, sometimes on the order of >6%–20%.

In addition to lack of conformity with the requirements of ASTM C-618, high carbon content fly ash has been shown to cause undesirable reduction in entrained air in concrete and it provides an oily or dark surface appearance on finished concrete surfaces since free carbon floats to the surface during finishing. Moreover, high carbon content fly ash exhibits reduction in desirable pozzolanic reactivity. Use of fly ash that is not in conformity with the aforementioned ASTM standard as a mineral admixture in Portland cement concrete and its consequent failure to meet material specifications raise serious liability problems.

Due to the limitations upon its ultimate end use, such high carbon fly ash also poses a disposal problem.

In light of the above, there exists a need in the industry to provide an inexpensive method and apparatus by which the carbon content (as measured by LOI) of high carbon containing fly ash mixtures can be reduced so that the resulting fly ash will conform with or exceed the above ASTM standard; therefore providing that the fly ash can be acceptably sold for and used as a mineral admixture for Portland Cement concrete products and other purposes.

Fly ash, collected as a by-product of burning pulverized coal which also has an unacceptable LOI content, presents a peculiar problem which inhibits separating a substantial portion of the carbon particle content from the alumina and silicate particle contents. This problem of separation includes the fact that fly ash is hygroscopic. Moisture, even in very small amounts, creates a surface bond between fly ash particles, including bonding of the non-carbon particles to carbon particles and the entrapment of carbon particles with co-bonded silicate and/or alumina particles. Thus, moisture contents as low as 0.9%, causes particle bonding, and can result in fly ash forming in bulk, a weight supporting surface due to the cohesion or aggregation of the individual particles.

When fly ash is formed, due to the extreme heat of combustion, it may be said to be totally dry or devoid of measurable moisture content. It is collected, conventionally, in a baghouse or by an electrostatic precipitator while it is yet hot, and is pneumatically conveyed to closed storage bins. However, due to its hygroscopic nature, in storage and in subsequent transport, the fly ash can readily pick up moisture from the surrounding air or from the air used for conveying the fly ash, which moisture will severely impede and hinder the separation of the carbon particles from the remaining particles, primarily silica and alumina silicate particles.

A further characteristic which impedes the separation of carbon particles from the remainder of electrostatic fly ash content resides in the fact that the carbon particles are formed and distributed throughout a wide range of particle sizes, including relatively easily separated large carbon lumps in the order of 100μ or more, together with a large quantity of exceedingly fine particles, as small as the finest of the fly ash particles, typically less than 10μ. The latter are much more difficult to separate and collect, and can comprise a substantial portion of the actual carbon content by weight and volume.

It is known that fly ash may be subjected to electrostatic separation processes, and that carbon particles can be separated from the bulk of the fly ash due primarily to the fact that the carbon particles are relatively more conduction than the bulk of the alumina and silicate particles. However, prior separation techniques and apparatus have failed to recognize or address the special characteristics of fly ash which impede or present effective separation.

SUMMARY OF THE INVENTION

This invention is directed to method and apparatus for the effective separation of carbon particles from fly ash. It is therefore directed to method and apparatus by means of which the carbon content, measured as loss on ignition (LOI), may be reduced to acceptable levels, such as 4.0% or less. The invention includes method and apparatus by means of which fly ash is treated to enhance the process of removing carbon particles, in a continuous operation.

Heater means heats the untreated fly ash to an elevated temperature and with sufficient dwell time for driving off in the form of water vapor, most, if not all, of the available free moisture in the form of water vapor. Preferably, the fly ash is subjected to direct contact heating in which the heated contact surfaces have a sufficient elevated temperature to provide for full vaporization of the water content.

The heated fly ash is maintained in a flowable heated condition and is applied by a feed hopper as a thin layer to the exposed upper surface of the belt of a generally horizontal belt-type conveyor. The hopper lays down a thin layer of heated fly ash onto the conveyor belt, which layer is then conveyed by the belt through an electrostatic charging and separating zone.

The electrostatic charging and separating zone includes an elongated electrode, spaced above and isolated electrically from, the conveyor belt. The electrode is elongated in a direction parallel to the direction of travel of the belt. The belt itself is formed of conductive material and is connected to form the second electrode of the electrostatic charging zone. The entire electrostatic charging zone is isolated from ambient conditions by an outer enclosure, by means of which the humidity of the internal air may be controlled at a desired low level and maintained at that level prior to and during operation.

The upper electrode is preferably formed with a pair of sections or portions of generally planar configuration, which sections are positioned in non-parallel relationship to the lower electrode in such a manner that diverging charge spaces are formed. These spaces are wider at the marginal edges of the belt than at the center of the belt. When viewed from the end, the upper electrode may be seen as formed with a dihedral angle, in which each electrode portion defines a small angle to the belt surface.

Heated fly ash is applied to the belt at a position upstream of the electrostatic charging zone defined as by the length of the upper electrode. The fly ash layer may have a minimum thickness of about 1/32 inch or less and have a maximum thickness of up to about 1/2 inch. The actual acceptable thickness depends on a number of variables, including the initial LOI content of the fly ash, and the strength of the electrostatic charge.

The electrostatic zone is preferably charged from a high voltage DC source in which the upper electrode is either positively charged or negatively charged, and in which the belt is grounded with the frame of the machine.

This apparatus includes means for heating the fly ash to drive off moisture, means for applying the fly ash to the upper surface of a conductive belt and delivering the fly ash through an electrostatic charging and separating zone. The zone includes an elongated electrode positioned above and in spaced relation to the belt and to the fly ash layer, and is formed with a width substantially equal to or greater than the width of the belt for the purpose of directing separated carbon particles into one or more bins or collection regions positioned along the one or more of the lateral sides of the belt for collecting the carbon-rich fraction.

Reject collecting bins are positioned at one or more of the positions along each lateral sides of the belt, and are formed with upwardly facing inlet openings positioned adjacent to the belt edge to receive reject material therethrough for funneling or conveying said reject material to a location beneath and/or alongside of the conveyor belt.

The applied voltage is sufficient so that an induced charge, and therefore a force, is applied to the carbon particles to cause such particles to move from the layer into a collision path with the upper electrode while the non-carbon particles are charged insufficiently to impart a lifting force thereto. This charge may be applied to the carbon particles by direct belt contact or by induction.

Simultaneously, the belt and the fly ash layer thereon, is subjected to relatively low frequency vibration for providing an agitating action to the fly ash layer for the purpose of releasing charged carbon particles from the layer. Preferably, this vibration is accomplished by imparting a mechanical jarring movement to the belt at a plurality of individual transverse positions. Such vibrations, in both energy and extent, may be the same for each of such positions or may be graded or different, provided that the end effect is that of redistributing the particles within the fly ash layer, to permit the exposure and release of charged carbon particles in the charging zone so that they may be released from the fly ash layer in an uninhibited manner.

The angle of the upper electrode portion to the belt surface, together with inherent gas ionization which occurs between the electrodes and inherent curvature of the electric field, causes the carbon particles to be transported transversely of the direction of movement of the belt and ultimately off of the side of the belt while still within the charge zone, where the particles will then drop into the openings of the collection bins. Impact with the inclined bottom surface of an electrode portion imparts a transverse force vector to the carbon particle, urging the particle to move away from the belt center and toward the belt edge. To enhance this process, it is preferable to form the upper electrode with an effective width which exceeds that of the belt.

The accepts may then be delivered by the belt from the environmentally controlled zone into a suitable receiving container. The reject material may, if desired, be processed further for the purpose of purifying or concentrating the carbon fraction to define a marketable product.

An important object of the invention is the provision of a method of treating fly ash having an excess amount of free carbon, for the purpose of removing carbon particles therefrom to a residual value of about 4.0% or less, comprising the steps of heating the fly ash to an elevated temperature for removing moisture therefrom and applying this heated fly ash to the upper exposed surface of a conductive belt of a belt-type conveyor, and then conveying such layer through an electrostatic charging and particle separation zone while imparting a vibration to the layer, preferably through the belt, to cause the particles to release the carbon content, and thereafter collecting the carbon particles which are attracted to the charging electrode.

A further important object of the invention is the provision of the method, as outlined above, in which the ambient air within the charging zone is maintained at a predetermined relatively low humidity, and in which the fly ash has been heated or treated for the purpose of removing substantially all of its moisture content prior to application of the electrostatic separating zone.

A still further object is the provision of apparatus designed and configured for the purpose of practicing the method, as outlined above.

These and other objects and advantages of the invention will be apparent from the following description, the accompanying drawings, and the appended claims.

BRIEF DESCRIPTION OF THE DRAWINGS

FIG. 5 is a plan view of the separator apparatus;

DESCRIPTION OF PREFERRED EMBODIMENT

Figure 1:
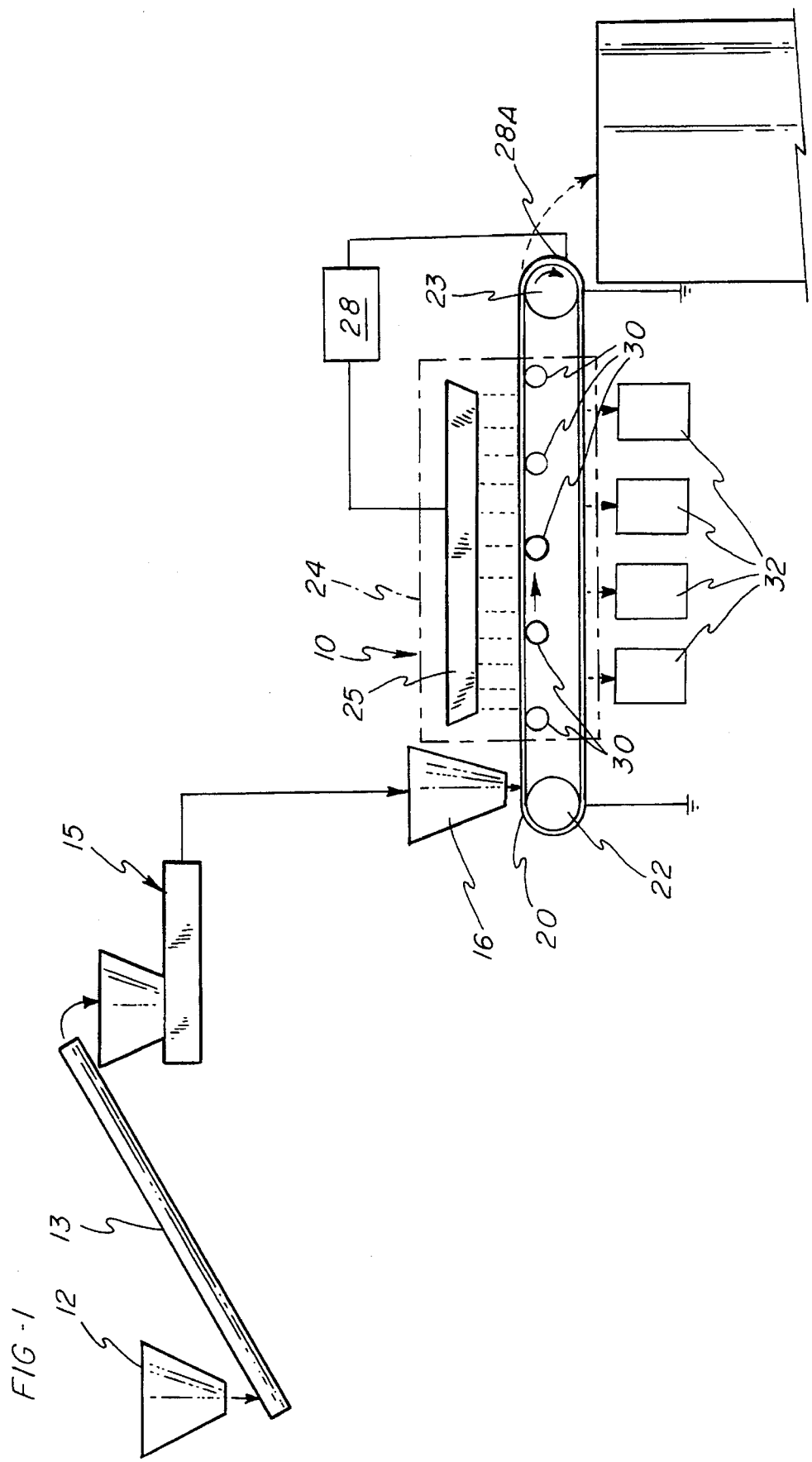
FIG. 1 is a schematic flow diagram showing the method and apparatus of this invention.

Referring to the figures of the drawing, which illustrate a preferred embodiment of the invention. In FIG. 1, a source of fly ash is delivered to the electrostatic separating apparatus 10 by any suitable means. In this view, a hopper 12 feeds an elevator screw 13 which delivers fly ash to a heater means 15. The fly ash to be treated for removal of excess carbon content, may have a carbon content in excess of 4.0% by weight and the actual carbon content may range from 8.0% or 9.0% up to as high as about 20% by weight. Such fly ash, which may be collected from a bag house or from electrostatic separation apparatus, is commonly stored in closed bins, but, nevertheless, since fly ash is hygroscopic, it can quickly attain a moisture content which will tend to bind the particles together, as has been previously described.

The heater means 15 preferably includes direct contact heating and flow inducing elements by which the fly ash to be treated is heated to a sufficiently high temperature, above the dew point, for the purpose of driving off moisture sufficient to break the surface bond between the particles.

Preferably, the heater means contains heated flighting which may be maintained by internal hot oil at a temperature of about 350° F. or higher, and is vented so that the moisture laden air is removed. The fly ash being treated is itself elevated to a temperature in excess of at least 100° F. and as high as about 212° F. and exits the heater means at an elevated temperature which may be about 200° F. For this purpose, the surface temperature of the feed flighting may be in the range of 250° F. to 600° F. or higher.

Particularly suitable apparatus for the heater means comprises a thermal processor sold under the trade name Holo-flite™ by Denver Equipment Company, 621 South Sierra-dre, Colorado Springs, Colo. 80901, although other means may be used for heating the fly ash sufficient to drive off moisture which causes bonding between the particles, preferably to a moisture content of 0.1% or less by weight.

The heated and desiccated fly ash is delivered from the heater means into a heated hopper 16 by which the fly ash is laid in a thin layer or film on the upper exposed surface of a conveyor belt 20. While in the hopper 16, the temperature of the fly ash is maintained such as by heating the walls of the hopper, and the fluidity of the fly ash is preferably maintained such as by stirring or agitators 18 within the hopper 16 driven by a motor 19.

A thin layer of heated fly ash is applied to the upper exposed surface of the belt 20. Preferably, the belt 20 is a conductive belt, described in greater detail below, and extend generally horizontally between a tail pulley 22 at the inlet end and a head pulley 23 at the outlet end.

The horizontal upper run of the belt 20 extends through an electrostatic charging and separating zone 24 defined at least by the horizontal extent of an upper electrode 25 positioned in spaced relation to the exposed upper surface of the belt 20.

The entire zone 24 which includes the electrode 25 and a major portion of the conveyor between the tail pulley 22 and the head pulley 23, is environmentally enclosed for the purpose of maintaining a low relative humidity therein, as described below.

The belt 20 forms one electrode of the electrostatic charging zone while the upper electrode 25 forms the second electrode, which is subjected to a controlled D.C. charge from a controllable power generator 28. Preferably, a DC charging current is developed with the electrode 25 being either positively or negatively charged, while the conveyor belt is connected to the opposite pole and, at the same time, is grounded. The high voltage power supply may be the model SR100PN6X2143 of Spellman High Voltage Electronics Corporation, 7 Fairchild Avenue, Plainview, N.Y. 11803.

The layer of fly ash carried on the upper surface of the belt is agitated for the purpose of rearranging the orientation of the particles within the layer. Preferably, this is accomplished by imparting a vibration to the fly ash layer through the belt 20, and in the preferred embodiment this vibration is supplied by means of a plurality of transversely extending, longitudinally spaced beater bars 30 which are described in further detail below.

The beater bars 30 impart a relatively low frequency excursion to the belt, which results in a continuous rearrangement of the particles in the fly ash layer as deposited by the hopper 16, throughout the charging zone, so that the carbon particles may be exposed or released and attracted toward the electrode 25 and ultimately collected as a reject material in bins 32. The accept fraction, which has had its carbon content, measured as LOI, reduced to 4.0% or less, is delivered by the belt off of the head pulley 23 and into a suitable collection bin or storage device 35.

Figure 2:
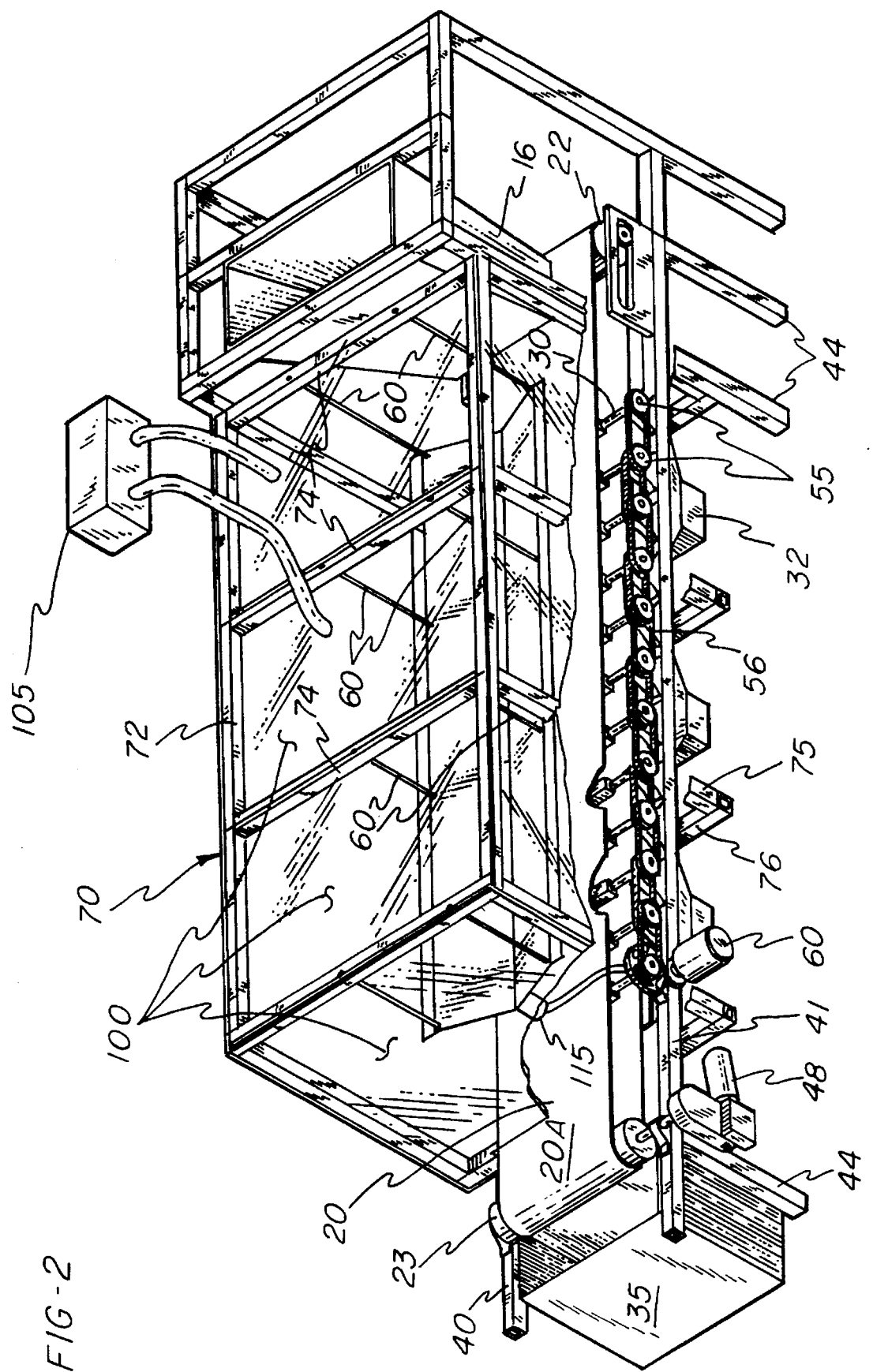
FIG. 2 is a perspective view of the electrostatic separator apparatus of this invention.
Figure 4:
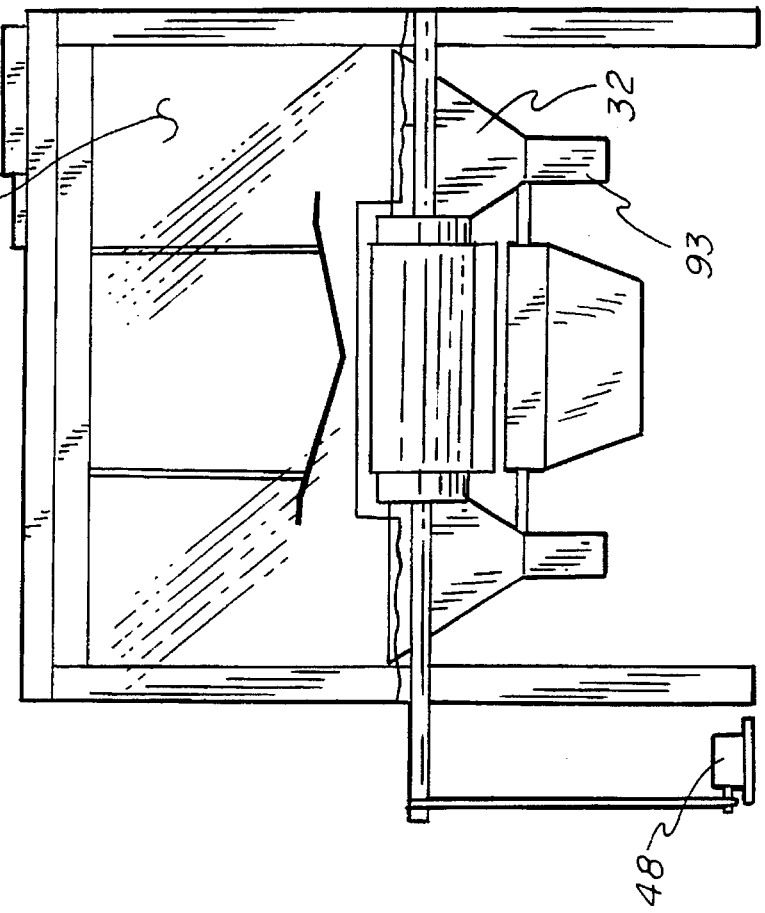
FIG. 4 is a further elevational view of the apparatus looking at the left hand end of FIG. 4.
Figure 3:
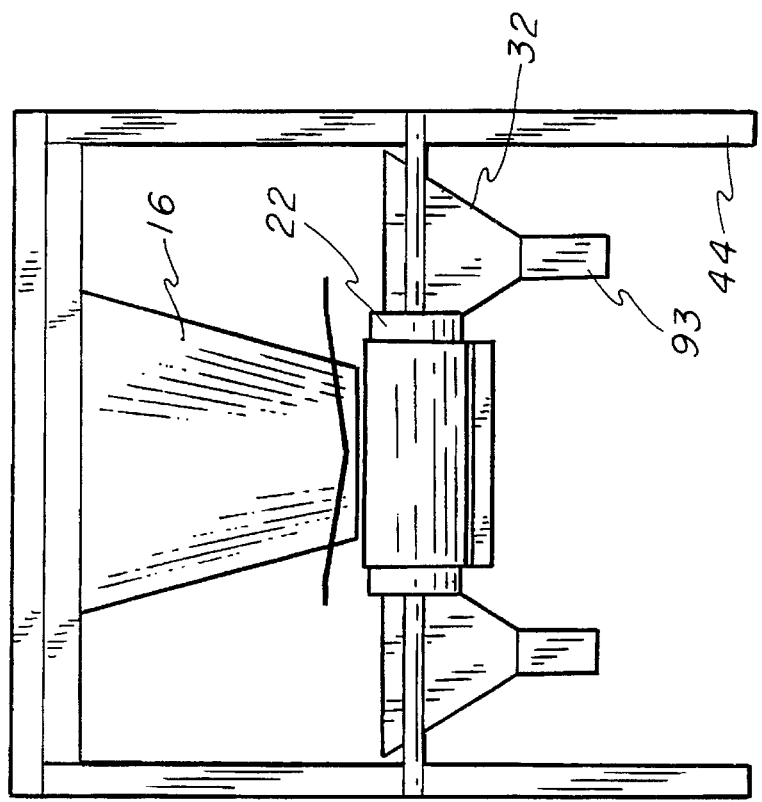
FIG. 3 is an end view of the apparatus as viewed from the right hand end of FIG. 2.

The preferred apparatus for performing certain steps of the method of this invention is illustrated in isometric view in FIG. 2 with rear and front elevational view respectively in FIGS. 3 and 4 and a top plan view of FIG. 5. The belt pulleys 22 and 23 are supported on a metal frame which includes a pair of parallel side rails 40 and 41 mounted on support legs 44.

The pulley shafts are mounted on conventional pillow blocks carried on the side rails, and one of the pulleys, such as the tail pulley, is adjustable on the rails to tension the belt. Belt 20 is formed with an upper run 20(a) which extends generally horizontally between the pulleys 22 and 23. The hopper 16 is preferably formed with means for maintaining the fly ash at its elevated temperature, as received from the thermal processor or heating means 15. For this purpose, one or more of the hopper side walls may be indirectly heated, such as by means of electrical resistance elements, not shown. Also, the interior of the hopper includes one or more agitator means such as the agitator 18 driven by motor 19 and shown in the plan view of FIG. 5 to maintain the fly ash in a fluid and disagglomerated state, for flow through the bottom slice opening 16b in a thin layer onto the exposed upper surface of the belt 20. The belt may be driven by a variable speed direct current drive 48 attached to the shaft of the head pulley 23, by means of which the rate of movement of the fly ash through the carbon separating zone 24 may be controlled.

Figure 7:
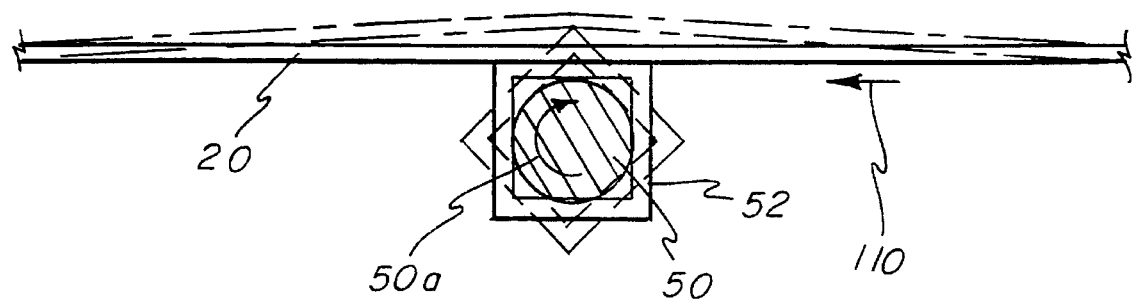
FIG. 7 is an enlarged end view showing the relationship of one of the beater bars to the conveyor belt.

The fly ash, as applied in a layer on the belt, is subjected to agitation or vibration to affect the repeated rearrangement of the orientation of the fly ash particles within the layer, thereby to permit the carbon fraction to be exposed. The carbon particles tend to rise to the top of the layer by reason of their lighter weight, and become charged and attracted by the electrostatic field for separation. For this purpose, the agitator means includes a plurality of beater bars 30, previously mentioned, having a structure substantially as seen in FIG. 7. Each of the beater bars 30 includes a central cylindrical drive rod 50 on which is mounted, such as by welding, a transversely oriented section of square tubing 52, the inside dimension of which forms a close fit to the outside diameter of the rod 50. The rods 50 are mounted, at their opposite ends, on suitable pillow blocks 53 carried on the horizontal frame members 40 and 41, and each is provided with chain sprockets 55 and connecting chains 56 by which the beater bars may be driven in unison by a direct drive motor 60.

As shown in FIG. 7, the belt 20 is tensioned to ride against the beater bars and be subject to mechanical exclusions represented by the deflection which occurs as the bars are rotated, as represented by the broken line position as shown in FIG. 7. The individual beater bars 30 may be operated in synchronism or out of synchronism to achieve the best separation results, and the vibrational excursions of the belt, as represented by the difference between the solid and broken lines in FIG. 7, is sufficient to agitate and rearrange the particles of fly ash on the belt but insufficient to cause the particles to be bounced high in the air and dislodged totally off of the belt merely by mechanical vibration. As an example, the beater bar tubular section 52 may be a 1¼" square tubing operating against the lower surface of the upper run of a 24" wide belt, and the bars may be rotated at a rate which provides impulses in the range of between about 100 to 800 excursions or impulses per minute.

A suitable conductive belt for the purpose of this invention as a ground electrode for the electrostatic charging and separating system, may be the type 2AM0925 sold by Ammeraal, Inc., 3720-J 3 Mile Road, Grand Rapids, Mich. 49504, or other suitable anti-static type belt capable of supporting and handling dry fly ash at an elevated temperature of an operating speed of at least 60 feet per minute and capable of absorbing repeated impacts from the beater bars 30 without deterioration.

The upper electrode 25 is formed in two generally planar longitudinally elongated sections or portions 25a and 25b which are each generally planar and which form, when viewed from the end, a dihedral angle.

The marginal edges 25 may be horizontal or flat and parallel to the belt 20 and provide a rod mounting surface.

The sections 25a and 25b are positioned in spaced relation above the upper surface of the belt 25 and form a diverging angle with the planar surface of the belt, in the order of a few degrees, such as about 2° or more to about 20°. Good results have been obtained with a 10° angle and therefore a 160° included dihedral angle.

The electrode 25 is electrically isolated and suspended in spaced relation above the belt on nylon rods 60 which extend from the edges 25c to form an electrically insulated and nonconductive upper frame 70. The frame 70 has side rails 72 to which are joined cross members 74 and vertical corner and intermediate members 75. The members 7 have inwardly turned ends 76 which are supported by one of the rails 40 or 42. The electrode support rods 60 are hung from the cross members 74.

Figure 6:
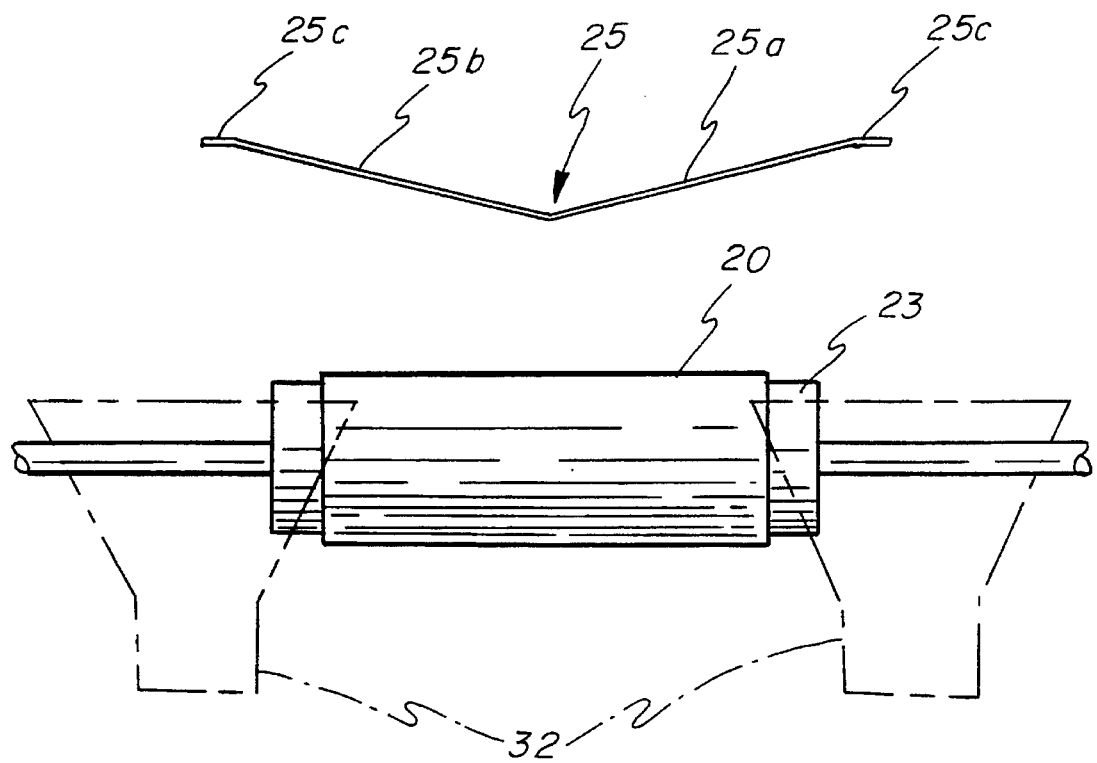
FIG. 6 is a somewhat diagrammatic view showing an end view of the upper electrode in relationship to the conveyor belt.

The electrode is suspended on the rods 60 in such a manner as it is centrally positioned over the upper surface of the belt, as shown in FIG. 6 and the planar sections 25a and 25b, longitudinally of the direction of belt movement, are parallel to the belt surface. The effective length of the electrode defines the particle separation or charging zone 24. The spacing of the electrode 25 to the belt 20 may be adjusted by raising or lowering the rods 60.

The position of the electrode 25 on the support rods 60 may be adjusted suitably by adjusting the position of the electrode thereon, in relation to the transverse member 74. This position defines the depth of the charging zone.

The effective width of the electrode 25 is wider than the width of the belt 20. This relationship is perhaps best shown in FIG. 6 in which it may be seen that the lateral turned edges 25c of the electrode extend beyond the edges of the belt 20, and over-the reject bins. The lateral edges 25c are therefore in vertical overlying relation to the mouth of a plurality of reject bins or hoppers 32 positioned beneath the belt and along the lateral edges thereof. The hoppers 32 are best shown in the top plan view FIG. 5 and the end view FIG. 4, and include generally funnel shaped upwardly-opening ends leading to a downwardly extending conduit 93. The bins or hoppers 32 form the means by which the carbon rich rejects from the charging and separating zone 24 are collected.

The nonconductive or dielectric upper frame 70 also supports, and on its outer surfaces, nonconductive enclosing panels 100 removably mounted on the outer surfaces of the frame members 72, 74, and the vertical frame member 75. The enclosing panels 100 may be made of a clear plastic sheet material substantially enclose the particle separation zone 24 defined by the belt and the electrode 25, and the ends of the belt extend therethrough, through suitable curtains or openings formed in the end panels.

The panels make possible an enclosed and controlled environment for the separation zone. The environment may be heated, but preferably is dehumidified such as by a dehumidifier 105. When the apparatus is in continuous operation, dehumidification is not required due to the heat applied to the interior by the flow therethrough of heated fly ash from the inlet hopper 16 keeps the interior dry. However, at least at start up, the interior is maintained at a relatively low humidity by the dehumidifier 105 or by other suitable desiccating or pre-heating means.

The practice of the method and the operation of the apparatus, described thus far, may be understood by referring to the following example and table. The results which are enumerated below were accomplished by using a belt, as identified above, having a width of 24", and an electrode 25 within the separator zone having a length of 8' and effective width of about 30", with a dihedral angle of 160° providing a 10° divergence for each of the sections 16a and 16b, and a mean or average space of the electrode 25 from the upper surface 20a of the belt 20 of about 8". Optimum results have been achieved with a voltage of about 20 kV to 60 kV is applied to the electrode, providing a voltage gradient in the order of about 3 kV to 8 kV per inch of charge space between the belt, as one electrode, and the electrode 25.

TABLE

| Test No. | Ignition Loss On Ignition (LOI) | LOI In Accepts | Percent Reduction | Depth Ash Layer | Belt Speed | Electrode Voltage |
|---|---|---|---|---|---|---|
| 9 | 9.33 | 8.8 | 5.68 | 0.25" | 60'/min | 100kV |
| 10 | 9.33 | 8.3 | 11.04 | 0.25" | 15'/min. | 40kV |
| 11 | 9.33 | 6.7 | 28.19 | 0.25" | 15'/min. | 50kV |
| 12 | 9.33 | 1.93 | 79.30 | 0.125" | 15'/min. | 60kV |
| 13 | 9.33 | 3.28 | 64.84 | 0.125" | 15'/min. | 20kV |
| 14 | 9.33 | 4.27 | 54.23 | 0.125" | 15'/min. | 80kV |
| 16 | 9.33 | 3.11 | 66.67 | 0.125" | 14'/min. | 45kV |

TABLE-continued

| Test No. | Ignition Loss On Ignition (LOI) | LOI In Accepts | Percent Reduction | Depth Ash Layer | Belt Speed | Electrode Voltage |
|---|---|---|---|---|---|---|
| 18 | 9.33 | 2.77 | 70.31 | 0.125" | 14'/min. | 20kV |
| 19 | 9.33 | 4.11 | 66.96 | 0.125" | 14'/min. | 25kV |
| 21 | 9.33 | 4.05 | 56.59 | 0.125" | 14'/min. | 45kV |

The electrode 25 may be directly connected to one terminal of the generator 28 while a belt itself may be connected to the other terminal by reason of a wiping contact 28a (FIG. 1) with the belt at as a pulley. Best separation results have been obtained when the fly ash layer applied to the upper surface of the belt by the hopper 16 is relatively thin, such as less than ¼" in thickness and the beater bars 30 are operated to rotate in the direction indicated by the arrow 50a in FIG. 7 contra to the direction of belt movement as illustrated by the arrow 110 at a speed to provide about 600 impulses/min.

The angle of the plate sections 25a and 25b is not critical as long as a shallow diverging angle is formed at either side of the longitudinal center of the belt and extending outwardly beyond the belt edges, so that the lighter and more electrically conductive carbon particles may be deflected into the hopper bins 32 located along and beneath each of the edges of the belt.

A charged carbon particle, whether charged by contact with a belt or by induction, is released from the fly ash layer by the agitation provided by the beater bars 30 through the belt 20, and flies up into contact with the electrode 25 and immediately assumes, by contact, an opposite charge. The impact velocity of the particle is translated into a transverse component of motion of the particle which then returns downwardly and outwardly. It will either directly enter one of the bins 32 or will again come into contact with the belt 20 or fly ash particles being carried by the belt, and become recharged. This process is repeated until the particle has escaped the separating zone and is dropped into a hopper or bin.

While the larger carbon particles are more readily separated, the apparatus removes a substantial quantity of the much smaller and harder-to-charge particles in the size range of less than 100 microns. This is made possible by the combination of heat to free the particles, and agitation which permits exposure of the charged carbon particles to direct belt contact and more importantly to inductive charging along an upper surface of the agitated fly ash layer, so that the smaller particles may be transported in the manner described above. The movement of the carbon particles laterally of the direction of belt movement is believed to be enhanced by an internal air flow pattern caused by the ionization of air in the space between the belt and the electrode 25, and the shape of the electrode at the ends 25c, and non-linear movement of the particle along this field tending to urge the particle transversely of belt movement. Best results have been observed when the belt has been moving at a linear feed rate of less than 30' per minute.

The efficiency of separation can be impaired by an accumulation of a small fraction of ash or other substances on then exposed lower surface of the electrode 25. It is believed that this may occur by reason of some of the non-carbon particles being partially conductive and therefore attracted to the electrode but which do not always reverse their polarity and fly off of the electrode following contact. These are believed to include sulfate-coated fly ash particles and iron particles expressed as $Fe_2O_3$ as well as certain of the magnesium and titanium particles. If such occurs, these may be easily dislodged the efficiency returned by a mechanical wrap or vibration applied to the electrode 25. For this purpose, a pneumatic rapper 105 may be attached directly to the electrode and operated periodically to provide a sudden jolt sufficient to dislodge the attachment of impeding particles to allow the same to drop back by gravity down to the belt.

The operation of the invention is believed to be fully self-evident from the foregoing description. Fly ash material may be applied to the thermal processor 15 by any suitable means, and the outlet of the thermal processor may be connected directly to the inlet of the hopper 16.

The ash temperature is maintained in the hopper 16 by the heated walls, and the agitator or stirring rod 18 is activated to maintain the fly ash in a fluid state, so that a controlled thin layer may be laid down or applied through the exit orifice onto the upper exposed surface 20a of the belt 20.

The belt drive is actuated to cause the belt to operate through the zone 24 at a desired rate, preferably at less than 60 feet a minute, and the electrostatic charge unit is activated and the amperage and voltage controls are set so as to provide a charge space having a voltage gradient of at least 2,000 volts per inch of space. Typical charge values will be between 40 kV and 60 kV.

Also, the beater bar drive motor is operated so that the beater bars are rotated for the purpose of agitating the fly ash particles within the applied layer to permit the carbon fraction to rise to the top so that it may be transported from the layer by the electrostatic field. Since the carbon particles charge more readily than any of the other particles, and since the carbon is, in itself, lighter than the remaining particles, it will be carried up to the surface of the electrode, discharged, and either returned to the belt or to one of the hoppers, as has been previously described, It is not expected that all of the carbon fraction can be removed as a practical matter. The very small particles, such as those 10 microns or less are not as readily susceptible to electrostatic charging and may comprise the majority of the carbon fraction which will remain in the fly ash, usually well below 4.0%, an acceptable level for most purposes.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Method of treating fly ash having a moisture content and having a carbon particle content for removing a major portion of the carbon particles therefrom comprising the steps of:

heating fly ash to be treated to a temperature sufficient to break the bond between fly ash and carbon particles caused by the moisture content of fly ash, applying the heated fly ash to the exposed upper surface of a belt of a generally horizontal belt-type conveyor in a layer having an average thickness of about 1/32 inch to about ½ inch, conveying said layer of heated fly ash by said belt through an electrostatic charging zone, repeatedly mechanically rearranging the orientation of the particles of fly ash in said layer while in said zone, subjecting said fly ash in said layer to an electrostatic field extending between an electrode at a position above said belt upper surface and said belt to impart on the carbon particles a charge in which the attraction to said electrode substantially exceeds the mass of such carbon particles for displacing said particles from said layer, and collecting said displaced particles.

2. The method of claim 1 including the further step of maintaining a controlled relatively low humidity in said zone.

3. The method of claim 1 in which the voltage gradient between said belt and said electrode is at least 2,000 volts per inch of spacing between said electrode and said belt upper surface.

4. The method of claim 1 in which said heating step heats the fly ash to be treated to a temperature of about 100° F. to 212° F.

5. Method of removing carbon particles from fly ash having a moisture content comprising the steps of:

heating fly ash in a thermal processor to a temperature of at least 100° F. to remove the moisture from the fly ash and break the surface bond between fly ash and carbon particles caused by moisture, applying the heated fly ash to the exposed upper surface of the belt of a generally horizontal belt-type conveyor in a thin layer, conveying said layer of heated fly ash by said belt below and overhead planar electrode of an electrostatic charging zone, repeatedly mechanically rearranging the orientation of the particles of fly ash in said layer while in said zone by increasing vibration to said layer by mechanical vibrations through said belt, subjecting said fly ash to an electrostatic field extending between the overhead electrode and said belt to impart on the carbon particles a charge in which the attraction to said electrode substantially exceeds the mass of such carbon particles for displacing said particles from said layer, and collecting said displaced particles in a bin.

6. Apparatus for separating carbon particles from fly ash, comprising:

a generally horizontally-extending conveyor having a head pulley and a tail pulley, and having an electrically conductive conveyor belt extending between said pulleys, said belt defining an exposed upper conveyor surface along an upper run of said belt, a hopper for applying fly ash to be treated in a layer to said upper belt surface at a position adjacent said tail pulley, a portion of said conveyor downstream of said hopper defining a carbon separating zone, belt impact apparatus positioned adjacent a lower surface of the upper run of said belt in said zone for imparting vibrational excursions to said belt upper run in said zone for causing said fly ash layer to be in a state of agitation, an elongated electrostatic charging electrode positioned above said belt upper run and extending the length of said zone, and extending transversely throughout said zone a distance greater than the width of said belt with lateral edges of said electrode extending over said bins, said electrode having a surface spaced from said belt upper surface and transversely inclined to said belt upper surface, bins positioned along the lateral sides of said belt for capturing therein carbon particles discharged from said zone at such belt lateral sides, means for driving said belt so that said layer moves through said separating zone, means for applying an electrostatic potential difference between said belt and said electrode, and means at the off-running side of said head pulley for receiving ash from which carbon particles have been removed.

7. The apparatus of claim 6 in which the voltage gradient between said belt and said electrode is at least 2,000 volts per inch of spacing between said electrode and said belt upper surface.

8. The apparatus of claim 6 in which said impact apparatus comprises a plurality of beater bars longitudinally spaced apart along said zone and each extending transversely of said belt and having means for displacing said belt when rotated, and means for rotating said bars.

9. The apparatus of claim 6 further comprising means for rapping said electrode to jar loose accumulated ash therefrom.

10. Apparatus for separating carbon particles from fly ash, comprising:

a generally horizontally-extending conveyor having a head pulley and a tail pulley, and having an electrically conductive conveyor belt extending between said pulleys, said belt defining an exposed upper planar conveyor surface along an upper run of said belt, a hopper for applying fly ash to be treated in a layer to said upper belt surface at a position adjacent said tail pulley, a portion of said conveyor downstream of said hopper defining a carbon separating zone, a vibrator for causing said fly ash layer in said zone to be in a state of agitation for releasing carbon particles from said layer, an elongated electrostatic charging electrode positioned above said belt upper run and extending the length of said zone, said electrode being formed with two planar portions connected along a line positioned over the center of said belt and each diverging at a shallow angle from said belt planar surface, bins positioned along the lateral sides of said belt for capturing therein carbon particles discharged from said zone at such belt lateral sides, said electrode having a width which exceeds the width of said belt, with lateral edges extending over said bins, means for driving said belt so that said layer moves through said separating zone, means for applying an electrostatic potential difference between said belt and said electrode, and means at the off-running side of said head pulley for receiving ash from which carbon particles have been removed.

11. The apparatus of claim 10 in which said shallow angle is about 10°.

12. The apparatus of claim 10 further comprising means enclosing said belt and-electrode in said zone and excluding ambient air and moisture from said zone.

13. The apparatus of claim 6 further comprising means enclosing said belt and electrode in said zone and excluding ambient air and moisture from said zone.

* * * * *